United States Patent
Hibi et al.

(10) Patent No.: US 6,928,232 B2
(45) Date of Patent: Aug. 9, 2005

(54) IMAGE PROCESSING APPARATUS WITH AUTOMATIC IMAGE PICKUP FEATURE

(75) Inventors: Keiichi Hibi, Matsudo (JP); Masahiro Shioi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 856 days.

(21) Appl. No.: 09/838,668

(22) Filed: Apr. 19, 2001

(65) Prior Publication Data

US 2002/0006163 A1 Jan. 17, 2002

(30) Foreign Application Priority Data

Apr. 19, 2000 (JP) .................................... 2000-117302

(51) Int. Cl.$^7$ ............................................. H04N 5/91
(52) U.S. Cl. ...................... 386/46; 386/109; 348/143
(58) Field of Search ................. 386/46, 95, 109–112; 348/143, 416.1, 155, 699, 173, 700; 375/240.16

(56) References Cited

U.S. PATENT DOCUMENTS

| | | | |
|---|---|---|---|
| 4,679,077 A | | 7/1987 | Yuasa et al. |
| 5,047,850 A | * | 9/1991 | Ishii et al. ............... 348/416.1 |
| 5,151,945 A | * | 9/1992 | Lee et al. .................... 348/155 |
| 5,471,239 A | * | 11/1995 | Hill et al. .................... 348/700 |
| 5,614,960 A | * | 3/1997 | Chiba et al. ............... 348/416.1 |
| 5,809,200 A | * | 9/1998 | Nishimoto et al. ............ 386/46 |
| 5,986,695 A | * | 11/1999 | Choi ............................ 348/143 |
| 6,580,466 B2 | * | 6/2003 | Siefken ....................... 348/173 |
| 6,646,676 B1 | * | 11/2003 | DaGraca et al. ............. 348/155 |

FOREIGN PATENT DOCUMENTS

| | | |
|---|---|---|
| EP | 0 660 327 A2 | 6/1995 |
| JP | 04-345382 | 12/1992 |
| JP | 06-153199 | 5/1994 |
| JP | 06-165181 | 6/1994 |
| JP | 07-123403 | 5/1995 |
| JP | 09-219854 | 8/1997 |
| JP | 09-251541 | 9/1997 |
| JP | 10285542 | 10/1998 |
| JP | 10-322682 | 12/1998 |
| JP | 11-18076 | 1/1999 |
| WO | WO 98/23085 | 5/1998 |

OTHER PUBLICATIONS

Navco Model 2700,S–VHS/VHS High Density VCR Sep. 1996, pp. 1–29 and Appendix A, B, C & D.*
Navco Model 1700 System Controller, pages reference Index all pages of Index, Jun. 1997.*
European Search Report cited in corresponding EPO Patent Application No. 01303548.0.
Copy of Sep. 7, 2004 Official Action for foreign counterpart Japanese Patent Application No. 2000–117302.
Copy of English translation of Sep. 7, 2004 Official Action for foreign counterpart Japanese Patent Application No. 2000–177302.

* cited by examiner

Primary Examiner—Vincent Boccio
(74) Attorney, Agent, or Firm—Edwards & Angell, LLP; David G. Conlin

(57) ABSTRACT

The image processing apparatus includes a change detecting portion for outputting a first control signal indicating transition from a small change state to a large change state and a second control signal indicating transition from a large change state to a small change state between picture planes of input motion picture data, and an operation control portion for controlling starting and stopping of recording or transmission of input motion picture data according to the first control signal and the second control signal. During recording or transmission, the operation control portion controls to stop recording or transmission if the first control signal is not output until after a predetermined arbitrary time T1 elapses after the second control signal is output.

20 Claims, 5 Drawing Sheets

IMAGE PROCESSING APPARATUS WITH AUTOMATIC IMAGE PICKUP FEATURE

BACKGROUND OF THE INVENTION

1. Field of the Invention

The present invention relates to an image processing apparatus for picking up (selecting) a motion picture and recording or transmitting the picked up motion picture, and more specifically, to an image processing apparatus having an automatic image pickup (selecting) feature that is suitable, for instance, for a monitor system and for observations of animal and plant ecology and the like.

2. Description of the Background Art

In recent years, progress in digitization of image equipment is being made due to progress and advances made in the digital signal processing techniques and digital coding techniques for images. In the field of image recording apparatuses, digital video cameras, digital still cameras, and the like are becoming widespread, and in such equipment, an input image signal is first digitized, and image signals are all handled as digital information throughout the processing, from signal processing such as coding to a process of recording onto a medium.

In this manner, when digital signal processing is more commonly performed within the image equipment, it becomes easier to implement a variety of features by additionally providing a signal processing feature to such equipment on top of other features required of such equipment to serve its originally intended purposes such as coding and conversion into a recording format.

A representative example of such additional features is an automatic image pickup feature used in a monitor system for security supervision, observation of animal and plant ecology, and so on. In the case of security supervision, such feature involves permanent provision of an image pickup unit such as a camera to be directed toward a target to be monitored, detecting a change in image content due to appearance of an intruder or occurrence of abnormality, and recording or transmitting to a central managing unit and the like the images from the time a change is detected so as to allow use of the images in notification of abnormality, in identification of the intruder, and in assessment and confirmation of the situation as well as to achieve saving of storage capacity and cutting back in transmission cost.

Moreover, in an example of ecology observation, such feature are realized as recording and transmitting only the images in which a target animal makes its appearance, and recording and transmitting at intervals of a few seconds or few tens of seconds the images representing a phenomenon that undergoes a slow change such as blooming of a flower or an ecdysis of an insect.

In the application for a monitor system as described above, a user is unable to operate the equipment constantly so that the essential techniques include a technique of detecting a change in the image content from input image signals and a technique of automatically controlling recording and transmission of images according to the detected result.

Images, particularly motion pictures, contain a very large amount of data so that normally upon recording and transmission, the amount of information is reduced using coding. In general, in coding of a motion picture, inter-frame or inter-field prediction is employed to extract and utilize only the information in which a change was found between picture planes.

Thus, for a certain picture plane, only the differential information from a previous picture plane that is referenced upon prediction would be recorded and transmitted as coded data. Upon prediction between picture planes, a process is also used which involves detecting a motion from a prediction reference picture plane per local region, local regions being obtained by dividing a picture plane into such local regions, and compensating for such motion.

Such process is called motion compensation. In addition, a motion in a local region can be represented as a two-dimensional vector value consisting of a value of horizontal component and a value of vertical component of the motion so that it is referred to as a motion vector.

In this manner, in the coding processing of a motion picture, a component representing a change in a picture plane is extracted from an input image signal and becomes an object of processing. Since such technique is the equivalent of the detection of a change in images in the above-described monitor camera system, a monitor camera system is realized which utilizes the processing in motion picture coding by itself or in combination.

Conventional examples of such monitor camera system that are known include devices described in Japanese Patent Laying-Open Nos. 6-153199, 10-285542, 10-322682, and 11-18076, for instance. These conventional techniques will be described below.

Japanese Patent Laying-Open No. 6-153199 proposes the monitor equipment in which a state change is detected in state change detection means based on input picture information or on compressed picture information having undergone compression processing, and when a change is detected, transmission means is activated in order to transmit the compressed picture information from before, in the midst of, and after the state change to a monitor station and the like.

Moreover, the above Japanese Patent Laying-Open No. 6-153199 discloses using an infrared sensor or a laser beam as the state change detection means to sense an intrusion of a person as well as detecting a state change based on a difference between the latest compressed image and a reference compressed image or based on a difference per pixel between an input image before compression and a reference image.

In addition, a method in which, instead of employing the simple difference per pixel, an image is divided into blocks and luminance values of all pixels in a block are accumulated for each of the blocks so as to allow detection of presence or absence of an object based on an amount of change in the cumulative values between images is disclosed, for instance, in Japanese Patent Laying-Open No. 9-251541.

Japanese Patent Laying-Open No. 10-285542 proposes an image recorder which stores in a recording medium prescribed images among input images, makes a comparison between input images and prescribed images using comparing means, and controls starting and stopping of image recording of input images according to a result of the comparison.

Moreover, the above Japanese Patent Laying-Open No. 10-285542 discloses detecting a motion vector in the input images using prescribed images as prediction reference images to compare a threshold value with a residual after motion compensation according to the motion vector using the comparing means, and allowing shared use of a processing portion in image compression coding means for the motion vector detection and the motion compensation.

In addition, a method of detecting a difference in total activity or per-block activities of image frames obtained from an operation result by discrete cosine transform upon compression coding processing so as to detect a motion in a video image or a motion vector is disclosed, for instance, in Japanese Patent Laying-Open No. 6-165181.

Japanese Patent Laying-Open No. 10-322682 proposes a monitor device for remote moving pictures in which a motion vector is detected in motion vector detection means between an input moving picture and an image of a previous frame, the input moving pictures are encoded by a moving picture encoding part based on the motion vector, a moving object detection part determines that a moving object is detected when a rate of blocks whose norm (magnitude) of motion vector is greater than a threshold value is within a prescribed range, and upon such determination, an ISDN (Integrated Services Digital Network) line connection is established to transmit the input images.

Japanese Patent Laying-Open No. 11-18076 proposes a video recorder having a time-lapse recording feature that enables intermittent recording of video signals at constant intervals, wherein input video signals are coded using MPEG (Moving Picture Experts Group) image compression in a video data converting part, and when a motion of video data is detected from the MPEG image compression information, the video signals from that time zone is precisely recorded as continuous dynamic images, and not through time-lapse recording.

In the conventional monitor systems described above, detection and notification of an intruder and occurrence of abnormality is the main purpose so that the systems are configured such that only those images in which a state change is detected as a result of comparison with a reference image or an initial input image are recorded and transmitted.

In applications such as a security supervision system, the target to be monitored is normally specified so that the content of the reference image is already known, and such arrangement as described above is sufficient, since no significance is found in recording and transmitting images that contain no changes.

When recording only the images in which a state change is detected, however, the recorded images become awkward representations that capture only the changes. Moreover, there is a problem of no recording taking place when the movement of an intruder is small and thus the change in the images is small.

Furthermore, there is a need to provide a special control that prevents recording of images and additional information when no change takes place in the images from the activation of an automatic image pickup feature to the termination of the automatic image pickup.

In addition, as described in Japanese Patent Laying-Open Nos. 6-153199 and 10-322682, transmission means is activated according to a state change in images so that, processes of connection and disconnection of a communication line must be performed frequently where a large state change and a small state change are alternately repeated. As a result, not only does the processing become burdensome but also negotiation delay, initial transmission delay, and the like occur in the connection procedure every time connection is established.

Moreover, in the case where image information from before, in the midst of, and after the detection of a state change, particularly, the images from the time before the change are to be transmitted, as described in Japanese Patent Laying-Open No. 6-153199, there is a need to provide a storage unit for retaining input or coded image information in preparation for an occurrence of a change at all times. Moreover, there is a problem of a significant delay after the detection of the state change due to starting the transmission from previous image information.

In the above Japanese Patent Laying-Open No. 6-153199, the images of a prescribed period that extends before and after the time of state change detection are merely handled as one mass. Thus, after a change takes place, if another change in images takes place during transmission related to the previous change, the latter change would not be detected, or even if it were detected, additional image information corresponding to the latter change cannot be transmitted, since the device is already in the midst of a transmission.

Moreover, with regard to a method of detecting a state change in images, when a difference of pixel values between images are utilized as described in Japanese Patent Laying-Open Nos. 6-153199 and 9-251541, while successful detection of any change can be ensured, such changes as a noise contained in an input image, changes in illumination and brightness, the entire image of a background or a scenery moving slightly, and so on whose recording is desirably to be avoided are also detected as changes.

Furthermore, in the case where a prediction error from after motion compensation prediction upon compression coding processing of images is employed in detection of a change as described in Japanese Patent Laying-Open No. 10-285542, the magnitude of the prediction error does not necessary represent the degree of change contained in the images, since the prediction error becomes small if the motion compensation prediction works effectively even when the images contain a motion.

On the other hand, in the case where a change in images is detected using a motion vector as described in Japanese Patent Laying-Open No. 10-322682, the motion vector being utilized is one that was detected for the purpose of image coding processing so that it does not necessarily express an accurate motion in the images. In addition, complex changes of images and a motion accompanying variation in color and brightness cannot be detected as motions so that they cannot be determined as state changes of images.

Moreover, when an apparatus automatically controls the starting and stopping of recording and transmission of images as described above, it becomes difficult for a user to determine the operative condition of the apparatus from outside, i. e. whether the apparatus is currently recording, transmitting, or being suspended. Thus, conventionally, characters indicating the operative condition or a marker and the like are superimposed for display on a display portion of the input image such as a viewfinder or a monitor.

Normally, in applications for monitor systems and the like, however, an image recording apparatus or a transmission apparatus is permanently provided by being directed toward a target to be monitored, while the user is at a remote location. In other words, the user is never observing the viewfinder, the monitor, or the like so that the user cannot determine the operative condition of the apparatus even when the condition is being represented on the viewfinder or the monitor. Thus, the user is unable to identify the operative condition of the apparatus from a remote location.

SUMMARY OF THE INVENTION

The present invention is made to solve the above-described problems, and an object of the present invention is to provide an image processing apparatus that is capable of recording or transmitting as a series of images background images and scenery images before and after a change as well as images in which a state change is detected.

Moreover, another object of the present invention is to provide an image processing apparatus that is capable of recording or transmitting more natural images such as those picked up in a manner similar to usual motion picture pickup and that can be utilized accordingly for a variety of uses.

A further object of the present invention is to provide an image processing apparatus that is capable of ensuring a detection of a change in images with only simple processing and without newly adding complex processing and that allows for control of starting and stopping of recording or transmission.

A still further object of the present invention is to provide an image processing apparatus that allows for an easy determination of an operative condition such as recording, transmission, and suspension from a remote location.

According to one aspect of the present invention, an image processing apparatus includes a change detecting portion for detecting a change between picture planes of input motion picture data and outputting a first control signal indicating a transition from a small change state to a large change state and a second control signal indicating a transition from a large change state to a small change state, and an operation control portion for controlling starting and stopping of recording or transmission of input motion picture data according to the first control signal and the second control signal, wherein during recording or transmission, the operation control portion controls to stop recording or transmission of input motion picture data if no outputting of the first control signal occurs until after a time T1 that can be set at will elapses after the second control signal is output.

According to the above invention, the recording or the transmission is controlled to be stopped after a predetermined time after it is detected that the change in the images has becomes small so that a series of images from occurrence of a change to disappearance of the change can be recorded or transmitted, i.e. from an image in which a change occurred up to background images, scenery images, and the like from after the disappearance of an intruder or abnormality, or the stopping of movement of and the disappearance of a target being observed. Thus, images having natural flow can be obtained, while at the same time, disappearance of a change can be confirmed from images recorded or transmitted.

In addition, the recording or transmission can be continued even in the case where an intruder temporarily stops his movement so that images can be obtained that ensure a full grasp of the condition of the target being monitored.

Furthermore, even in the case where a plurality of state changes are recorded or transmitted as a series of images, since it is possible to record or transmit the images along with those images representing no changes intervening in between, not only can natural images be obtained, but also confirmation can be made from the recorded or transmitted images that sometime a condition in which an intruder or an abnormality disappeared existed.

In particular, even with images including alternating repetition of a large change state and a small change state, these images can be treated as continuous images without having frequently to switch between starting and stopping of recording or transmission.

Thus, complex intricate control becomes unnecessary, while recording or transmission of images having natural flow, movement, and change becomes possible, and particularly when images are transmitted, connection delay, negotiation delay, initial transmission delay, and the like that occur upon connection to a communication line can be avoided.

In this manner, the process required for delaying the stopping of recording or transmission can be easily achieved by waiting for a prescribed time period T1 using a timer and the like after it is detected that the change is small so that implementation is facilitated. As a result, almost no addition takes place of hardware and software required for the process, and implementation is also facilitated in compact, portable equipment.

According to another aspect of the present invention, an image processing apparatus includes a change detecting portion for detecting a change between picture planes of input motion picture data and outputting a first control signal indicating a transition from a small change state to a large change state and a second control signal indicating a transition from a large change state to a small change state, and an operation control portion for controlling starting and stopping of recording or transmission of input motion picture data according to the first control signal and the second control signal, wherein the operation control portion controls to start recording or transmission of input motion picture data as soon as an operation is activated for controlling starting and stopping of recording or transmission by the operation control portion, and thereafter, the operation control portion controls to stop recording or transmission of input motion picture data when a time period T2 that can be set at will has elapsed without the first control signal being input.

According to the above invention, when an operation is activated for controlling starting and stopping of recording or transmission by the operation control portion, it is controlled to start the recording or transmission as an initial state so that the so-called reference images such as of background and scenery that are to become a target of monitoring or observation before a change takes place can be initially recorded or transmitted.

Thus, it becomes possible to confirm what sort of change has taken place in a series of images when images in which a change is detected are recorded or transmitted at a later time. Particularly, both the state without the change and the state with a change occurring can be confirmed from the recorded or transmitted images even in the case of general images which is different from the case of a security supervision system where the target to be monitored is specified in advance so that the manner and condition of the change can be accurately recognized without prior knowledge regarding the target to be monitored.

In this manner, images having natural flow can be obtained, since recording or transmission is possible of continuous images from images of a state having no change to images having a change taking place.

In addition, when a control operation for recording or transmission is activated, the initial images would be recorded or transmitted without fail even though no change may occur later to the images. Thus, the very existence of such recorded or transmitted images can serve as a record of the fact that no change had occurred.

Moreover, in the case where no change occurs to the images, the special control required for completely deleting information that is in the midst of recording and the temporarily recorded content in order to avoid recording of images and additional information becomes unnecessary. Further, every time a control operation is activated, storage region may be secured, additional information may be recorded, and preliminary line connection such as a transmission link may be established so that the processing can be simplified.

The processing required for this purpose is a control to start recording or transmission as soon as the recording operation based on the above-described control is activated and to stop the recording or transmission after waiting for a prescribed time period T2 using a timer and the like. Addition of such processing provides simple realization of the control and facilitates implementation. Thus, almost no addition of hardware and software required for the processing takes place, and implementation is facilitated in compact, portable equipment as well.

According to a further aspect of the present invention, an image processing apparatus includes a motion compensation prediction portion for dividing a picture plane of input motion picture data into prescribed regions, performing for each region a motion compensation prediction with a reference picture plane stored in a frame memory, and outputting a prediction error, a motion vector of each region, and a sum of squared difference of luminance values of pixels within a region between picture planes; a prediction error coding portion for coding the prediction error and outputting coded motion picture data; a change detecting portion for detecting a change between picture planes from the motion vector and the sum of squared difference and outputting a first control signal indicating a transition from a small change state to a large change state and a second control signal indicating a transition from a large change state to a small change state; and an operation control portion for controlling starting and stopping of recording or transmission of input motion picture data according to the first control signal and the second control signal.

According to the above invention, a change in images is detected using a motion vector derived from motion compensation prediction processing when input motion picture data is subjected to coding processing, and a difference of pixel values between picture planes so that no new processing need to be added in order to derive a feature amount required for detection of a change in images.

Since the processing required for detection of a change in images is only the very simple processing such as comparing a motion vector or a sum of squared difference with a threshold value, an increase in the amount of processing due to these additions is almost negligible. Thus, implementation can be facilitated even in the case where low power consumption and compactness are desirable as in portable equipment and the like.

By additionally providing the above-described simple processing to a widespread image processing apparatus provided with a motion picture coding unit, the apparatus can be easily provided with an automatic control feature of starting and stopping of recording or transmission according to a change in images. Thus, it becomes possible to bring out to the fullest the advantages of performing a digital image processing using such apparatuses, while use development and widespread proliferation can be achieved through simple addition and extension of a feature.

According to a still further aspect of the present invention, an image processing apparatus includes an operation control portion for instructing a timing of recording or transmission so as to record or transmit input motion picture data intermittently at prescribed time intervals, and an announcing portion for announcing to outside the apparatus, according to control of starting and stopping of recording or transmission of the input motion picture data by the operation control portion, that a recording operation or a transmission operation is currently taking place.

According to the above invention, a timing of recording or transmission can be announced during recording or transmission using time-lapse in which input motion picture data is recorded or transmitted intermittently so that a user can easily determine from a remote location when the apparatus is recording or transmitting.

In other words, since the timing of recording or transmission can be announced to a user in a location remote from the apparatus, the user, while confirming the timing of recording or transmission, can easily move an object of image pickup during suspension between recording or transmission and create an animation using the recorded or transmitted images.

In addition, when the user himself becomes an object of image pickup and picks up an image of himself as in the case of picture taking with a camera using a self-timer, the timing of recording or transmission is recognized easily and clearly so that recording or transmission of images that suit the purpose can be ensured, and failure of image pickup is less likely to occur.

Thus, such apparatuses can be utilized not only for specialized uses such as for a monitor system but also by a general user with ease and for a variety of purposes, which leads to development of new applications of an image recording apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the image processing apparatus, for instance, an image recording apparatus, according to the present invention will be described in detail below with reference to FIGS. 1 to 5.

Figure 1:
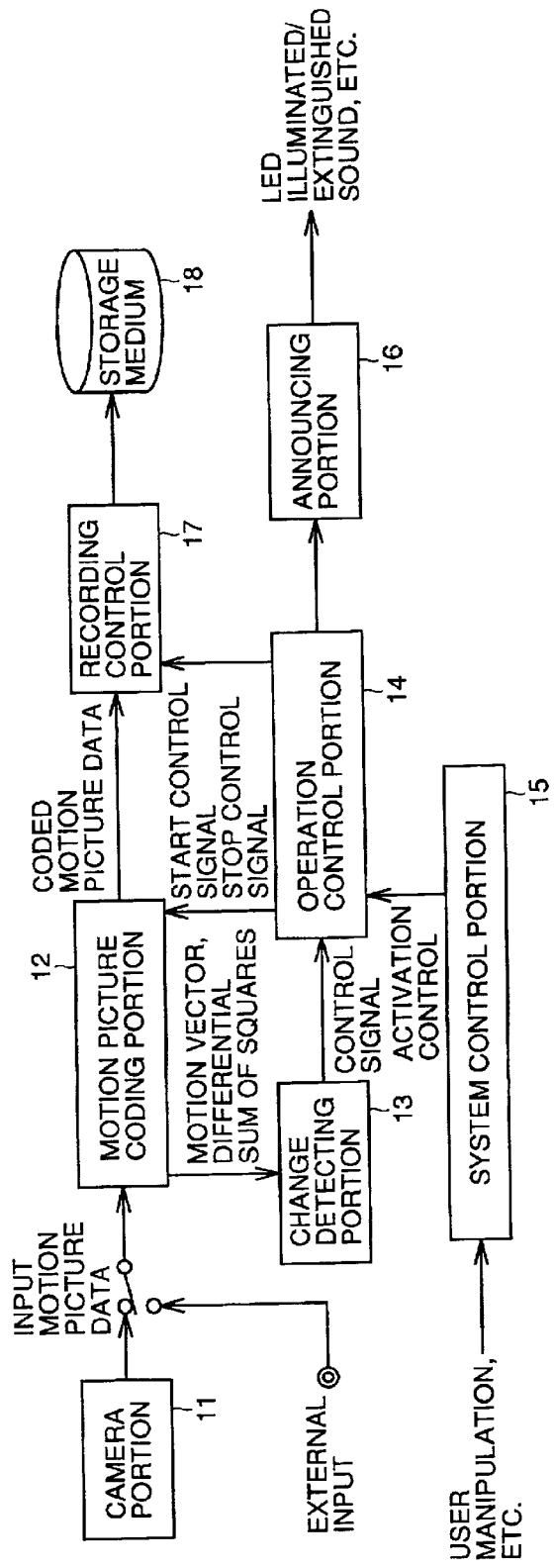
FIG. 1 is a block diagram illustrating an example of a schematic arrangement in one embodiment of an image processing apparatus according to the present invention.

FIG. 1 is a block diagram illustrating a schematic arrangement in an image recording apparatus of the present embodiment. In FIG. 1, input motion picture data is input from a camera portion 11 for picking up an image or from an external input. The input motion picture data is subjected to compression coding in a motion picture coding portion 12 and coded motion picture data is output.

In motion picture coding portion 12, processing according to motion picture coding scheme such as ITU-T Recommendations H.261, H.262, H.263, H.26L, ISO Standards 11172-2 (MPEG-1), 13818-2 (MPEG-2), 14496-2 (MPEG-4), or nonstandard original scheme is performed, and coded motion picture data of a format that is consistent with the convention according to one of these schemes is output. The coded motion picture data is sent to a recording control portion 17 and is stored in a storage medium 18.

At this time, in recording control portion 17, such shaping processing as packetizing coded motion picture data and multiplexing processing together with voice data are performed in order to record the coded motion picture data into storage medium 18 according to a prescribed format, while at the same time, control information such as header, footer, index, title, and attribute information are generated and stored together with the coded motion picture data into storage medium 18 in a prescribed location in a prescribed format.

Storage medium 18 can be any tape medium such as a video tape, any disk medium such as an optical disk or a magnetic disk, or any card medium such as an IC card or a memory card. The format in which coded motion picture data and control information are to be stored should be one that is consistent with the recording format or the file format according to the respective media.

Recording control portion 17 is configured such that it is capable of performing, as soon as its operation is activated, such processing as generation and recording of control information for recording new coded motion picture data and creation of a new motion picture file.

This is effected by a start control signal being output from an operation control portion 14 without fail so as to allow recording of initial motion picture data after the activation of the operation in the image recording apparatus of the present embodiment.

The above is one characteristic of the image recording apparatus according to the present embodiment that differ from the above-described conventional example which effects no recording of coded motion picture data when no change is detected in input motion picture data even after the operation is activated.

A motion vector obtained during compression coding processing of input motion picture data and a sum of squared difference of pixel values between picture planes are output from motion picture coding portion 12 and sent to a change detecting portion 13.

Change detecting portion 13 uses information input from motion picture coding portion 12, detects a change in images in the input motion picture data, and outputs a control signal to operation control portion 14.

The control signal is one of a first control signal that indicates transition from a small change state to a large change state of images and a second control signal that indicates transition from a large change state to a small change state of images.

Operation control portion 14 outputs a start control signal and a stop control signal to motion picture coding portion 12 and recording control portion 17 based on the control signal from change detecting portion 13.

The start control signal and the stop control signal are the signals that respectively instruct starting and stopping of compression coding processing in motion picture coding portion 12, an operation of outputting coded motion picture data, and an operation of recording coded motion picture data in recording control portion 17 into storage medium 18. Detailed operations of change detecting portion 13 and operation control portion 14 will be described later.

In addition, operation control portion 14 outputs the start control signal and stop control signal to an announcing portion 16 as well. Announcing portion 16 announces to outside the apparatus an operative condition of the image recording apparatus according to an input control signal by means of illumination of an LED, a lamp and the like, or sound.

When an LED or a lamp is used as the means of making an announcement, announcing portion 16 makes the announcement by illuminating the LED or the lamp when a start control signal is input, extinguishing it when a stop control signal is input, and keeping the LED or the lamp lit up during recording operation. These operations may be reversed; that is, the LED or the lamp may be extinguished during recording, and illuminated while the operation is suspended.

Moreover, in the case where a two-color light emitting LED or the like is used, the light may be extinguished at the time of inoperative condition when processing itself in the respective portions is not activated, a green light may be illuminated while the operation is suspended, and a red light may be illuminated during recording.

On the other hand, when sound is used as the means for announcement making, announcing portion 16 announces to outside the apparatus that a change in the operative condition has occurred, for example, by sounding a buzzer or activating a speaker with a signal beep sound or a pulse sound signal at the time when a start control signal and/or a stop control signal is input.

In addition to the above, such voice signals may be provided as a message "The recording is started" for a general user, and "A problem is detected" and "An intruder alert!" for a security monitor system.

A system control portion 15 performs the control of the overall image recording apparatus such as activation and termination of processing of each module by receiving an instruction from a user or from outside, for example, via manipulation of a button or a switch.

Moreover, operation control portion 14 also controls the so-called time-lapse recording which involves intermittently recording input motion picture data, besides performing the control of starting and stopping of recording based on a change in input motion picture data according to the control signal from change detecting portion 13.

In this case, operation control portion 14 controls such that motion picture coding portion 12 and recording control portion 17 codes and records input motion picture data of one or more desired picture planes at appropriate time intervals such as a few seconds.

This control may be performed by issuing start control signals at appropriate intervals and issuing a stop control signal after a desired number of picture planes have been coded and recorded, or by issuing at appropriate intervals start control signals that designate as a parameter that only the desired number of picture planes should be coded and recorded.

In this manner, also in the case where operation control portion 14 controls time-lapse recording, announcing portion 16 announces the operative condition of the image recording apparatus to outside the apparatus according to a start control signal and a stop control signal from operation control portion 14, as in the case described above.

As described above, in the present embodiment, change detecting portion 13 detects a change between picture planes in the input motion picture data and outputs a first control signal and a second control signal. The first control signal is output when transition is detected from a state in which the change in images is small to a state in which the change in images is large. The second control signal is output when transition is detected from a state in which the change in images is large to a state in which the change in images is small.

The first control signal and the second control signal are input to operation control portion 14. Operation control portion 14 controls so as to start recording of input motion picture data when a control operation is activated according to an instruction from outside such as via user manipulation.

This control is performed by instructing motion picture coding portion 12 to start the processing of coding input motion picture data and outputting coded motion picture data, while at the same time, by instructing recording control portion 17 to record into storage medium 18 the coded motion picture data output from motion picture coding portion 12.

Thereafter, operation control portion 14 controls to stop recording of input motion picture data when no inputting of a first control signal from change detecting portion 13 takes place during a predetermined time period T2.

Contrary to the above, this control is performed by instructing motion picture coding portion 12 to stop coding of input motion picture data and outputting of coded motion picture data, while at the same time, by instructing recording control portion 17 to stop the operation of recording coded motion picture data into storage medium 18.

In addition, when the first control signal is input from change detecting portion 13 to operation control portion 14 while recording is suspended, operation control portion 14 controls to start recording of input motion picture data in the same manner as the above-described operation when the control operation is activated.

Thus, when a recording state is attained, operation control portion 14 waits for a second control signal to be input from change detecting portion 13. After the second control signal is input, operation control portion 14 controls to stop recording of input motion picture data if no inputting of the first control signal from change detecting portion 13 occurs during a predetermined time period T1.

This control to stop recording is the same as the above-described operation. Here, time period T1 and time period T2 can be set to different values individually. Moreover, time period T1 and time period T2 can be those which are set arbitrarily by a manufacturer as factory default setting, or those that a user can change and set at will.

In addition, when controlling to start recording of input motion picture data, operation control portion 14 notifies announcing portion 16 of such starting of recording. Moreover, operation control portion 14 also notifies announcing portion 16 of the stopping of recording when controlling to stop recording of the input motion picture data.

Upon receiving these notifications, announcing portion 16 performs the operation of announcing the operative condition to the outside by illuminating an LED, a lamp, or the like when recording is started and extinguishing it when recording is stopped, for example.

Moreover, announcing portion 16 may announce the starting and stopping of recording by providing sounds in place of or in addition to illumination and extinguishing of an LED or a lamp.

The timing at which the sound is provided should be at an appropriate time after the start of operations of motion picture coding portion 12 and recording control portion 17 if the sound is to be included in the recording as well, or immediately before the start of operations of motion picture coding portion 12 and recording control portion 17 if the sound is not to be recorded.

Figure 2:
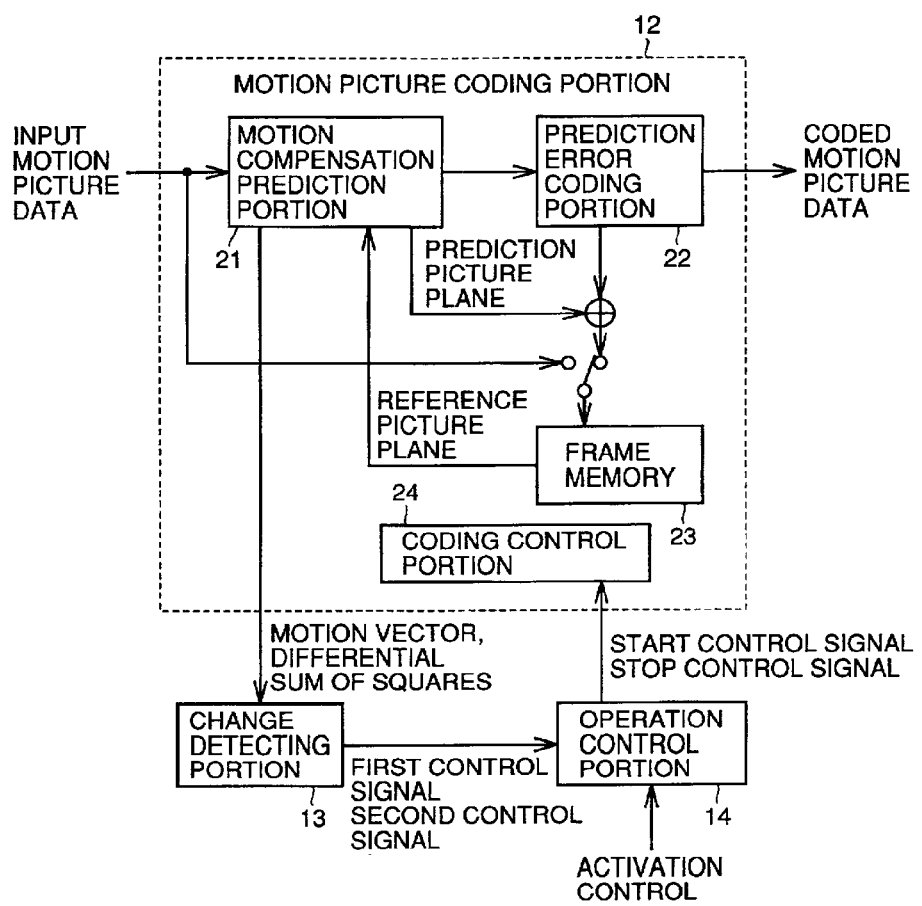
FIG. 2 is a block diagram illustrating an example of an arrangement of a main portion in the embodiment of the image processing apparatus according to the present invention.

Now, a schematic arrangement of motion picture coding portion 12 in the image recording apparatus of the present embodiment is shown in FIG. 2. In FIG. 2, a change detecting portion 13 and an operation control portion 14 are the same as those described above with reference to FIG. 1.

A motion picture coding portion 12 is formed by a motion compensation prediction portion 21 for performing detection of a motion vector and motion compensation prediction based on a reference picture plane and a coding target picture plane of input motion picture data to output a prediction error, a prediction error coding portion 22 for coding the prediction error and outputting coded motion picture data, a frame memory portion 23 for storing a reference picture plane, and a coding control portion 24 for controlling respective portions of motion picture coding portion 12.

Motion compensation prediction portion 21 performs inter-frame or inter-field prediction between a coding target picture plane of input motion picture data and a reference picture plane read out from frame memory portion 23 and creates a prediction value for the coding target picture plane from information contained in the reference picture plane.

Then, motion compensation prediction portion 21 outputs a difference compared with the prediction value as a prediction error to each of the pixels in the coding target picture plane. In the inter-frame or inter field prediction, besides simply taking a value of a pixel in the same location within the reference picture plane to be a prediction value for each pixel in the coding target picture plane, motion compensation prediction is used which takes into account a motion contained in motion picture data and compensates for the motion.

In motion compensation prediction, a coding target picture plane is first divided in to blocks of regions having a prescribed size, i.e. square regions formed of 16×16 pixels or 8×8 pixels, for instance. Then, a block appropriate for a prediction value of each block within a reference picture plane is searched.

In general, this search is performed by shifting the position of a block little by little within a pre-set range in the reference picture plane and determining whether a block in that position is appropriate as a prediction value.

As the criteria for determining such appropriateness, sum of squared difference or sum of absolute differential values for each of the pixel values within a block is used. Thus, for a block in a coding target picture plane, a shift in position of a block searched as a prediction value of the block within the reference picture plane is expressed as a motion vector.

In addition, motion compensation prediction portion 21 performs determination processing of whether to perform motion compensation or not (a motion vector is set to zero and the block in the same position is taken as the prediction value) for each block, and of whether to take a pixel value itself of the block in the coding target picture plane as a target of coding without performing a prediction between picture planes (referred to as an intra-frame mode or an intra mode).

In this determination processing, with regard to performing or not performing motion compensation for each block, error energy without motion compensation (such as a sum of squared difference and sum of absolute differential values of pixel values within a block) is compared with error energy after motion compensation. Regarding determination of whether to perform prediction between picture planes or not, error energy without motion compensation or after motion compensation prediction is compared with energy of pixels within a block (such as sum of squares of pixel values).

Motion compensation prediction portion 21 outputs to change detecting portion 13 a motion vector for each block of the coding target picture plane obtained in the course of the above-described processing, error energy (sum of squared difference of pixel values compared with a block in the same position in the reference picture plane) without motion compensation (motion vector=0), and the like.

Moreover, prediction error coding portion 22 performs such processing as an orthogonal transformation such as DCT (Discrete Cosine Transform), quantization of a transform coefficient, variable-length coding of an index that is a quantization result, for a prediction error output from motion compensation prediction portion 21 or for a pixel value itself with respect to a block in the intra mode, and outputs coded motion picture data.

Beside a coded word after variable-length coding which is the coding result of image itself, coded motion picture data include information such as header information including picture plane size, picture plane number, and identification of coding method and the like, attribute information indicating quantization scale and a selected coding mode, and a motion vector value used for prediction in motion compensation prediction portion 21.

Therefore, these information required for creating coded motion picture data in prediction error coding portion 22 are input from motion compensation prediction portion 21, coding control portion 24, and so on.

In addition, the coding result of a current coding target picture plane is utilized as a reference picture plane for prediction for the next coding target picture plane. Thus, prediction error coding portion 22 performs the processing of decoding the prediction error which it itself coded, and outputs a decoded result of the prediction error.

The output decoded result of the prediction error is added to a prediction value for the coding target picture plane output from motion compensation prediction portion 21 and a decoded picture plane which is the decoded result of the coding target picture plane is created.

The decoded picture plane is what is created inside motion picture coding portion 12 as an image supposedly derived upon decoding the output coded motion picture data in a motion picture decoding unit such as an image reproducing apparatus, and is referred to as a local decoded image.

The local decoded image for a current coding target picture plane is utilized as a reference picture plane for prediction for the next coding target picture plane so that it is stored in frame memory portion 23.

Coding control portion 24 performs control of the above-described respective portions within motion picture coding portion 12. Coding control portion 24 performs the control, for instance, of determination and instruction of a parameter such as a quantization scale required in coding processing of input motion picture data, and designation of a frame interval of a picture plane that is to be a target of coding, as well as the control of operation such as activation, termination, and the like of processing operations of the respective portions.

From operation control portion 14, a start control signal and a stop control signal for control of activation and termination of processing operation in motion picture coding portion 12 and for coding processing are input to coding control portion 24.

When operation control portion 14 instructs the activation of processing operation, coding control portion 24 is activated such that motion compensation prediction portion 21 and frame memory portion 23 start processing, while prediction error coding portion 22 remains inactivated.

At this stage, the respective processing must be activated in order for motion compensation prediction portion 21 to derive and output to change detecting portion 13 a motion vector and sum of squared difference of pixel values within a block, and accordingly for frame memory portion 23 to store a reference picture plane and to supply it to motion compensation prediction portion 21; however, actual coding processing is not necessary so that prediction error coding portion 22 need not be activated.

Moreover, outputting of a motion vector and a sum of squared difference to change detecting portion 13 is sufficient processing required of motion compensation prediction portion 21 so that not all of the processing that is performed in motion compensation prediction portion 21 need to be performed.

At this time, prediction error coding portion 22 does not perform processing, and a local decoded image is not obtained so that the local decoded image cannot be utilized as a reference picture plane. Thus, coding control portion 24 switches the input of frame memory portion 23 such that a picture plane of input motion picture data is stored into frame memory portion 23 as a reference picture plane for motion compensation prediction of the next target picture plane.

In addition, picture planes that are to be the target of processing to derive a motion vector or a sum of squared difference by motion compensation prediction portion 21 can be all of the picture planes in input motion picture data, or the skipped picture planes in which some picture planes are dropped out from the input motion picture data, as in the case where coding processing is actually performed.

In general, in coding processing of a motion picture, motion compensation prediction processing involves a great amount of processing and the proportion of this processing in the overall processing is also quite large so that motion compensation prediction portion 21 is designed such that it is capable of performing real time processing only for picture planes of motion picture data after a prescribed skipping is performed.

In such a case, the latter technique of processing picture planes after skipping is adopted. Moreover, picture planes stored in frame memory portion 23 may be the picture planes that became the target of processing or the picture planes that were skipped and not subjected to processing.

When a start control signal is input from operation control portion 14, coding control portion 24, in addition to the above, controls to activate all processing in motion compensation prediction portion 21 and processing in prediction error coding portion 22, thereby causing coding processing of input motion picture data and outputting of coded motion picture data.

At this time, the input of frame memory portion 23 is switched so that a local decoded image is stored therein.

Therefore, it becomes possible for motion compensation prediction portion 21 to perform motion compensation prediction processing in a normal coding processing, using the local decoded image stored in frame memory portion 23 as a reference picture plane.

Thereafter, when a stop control signal is input from operation control portion 14, coding control portion 24 stops unnecessary processing in prediction error coding portion 22 and motion compensation prediction portion 21, and controls to switch the input of frame memory portion 23 to receive picture planes of input motion picture data. Motion picture coding portion 12 returns to the state after activation of processing described above.

As described above, in the present embodiment, motion picture coding portion 12 includes motion compensation prediction portion 21 for performing motion vector detection, motion compensation prediction, and the like between a coding target picture plane of input motion picture data and a reference picture plane, prediction error coding portion 22 for coding a prediction error, and frame memory portion 23 for storing reference picture planes.

While motion picture coding portion 12 performs the coding processing, prediction error coding portion 22 operates and outputs coded motion picture data. On the other hand, motion compensation prediction portion 21 is in operation even while motion picture coding portion 12 is not performing coding processing, and outputs to change detecting portion 13 a detected motion vector and a sum of squared difference of luminance values of pixels between blocks in the same position between a target picture plane and a reference picture plane.

The sum of squared difference is calculated as a difference between picture planes when no motion compensation is performed, i.e. when a motion vector is zero. Change detecting portion 13 uses a motion vector and a sum of squared difference from motion compensation prediction portion 21 to detect a change in images.

At this time, a prediction reference picture plane for motion compensation prediction portion 21 is stored in frame memory portion 23. The image stored in frame memory portion 23 to be used as a reference in the next prediction of an input picture plane is a local decoded image of a current coding target picture plane in motion picture coding portion 12 in the case motion picture coding portion 12 is in the midst of the coding operation and is a picture plane of input motion picture data not subjected to coding processing in the case the operation of motion picture coding portion 12 is suspended.

Thus, a processing portion which is a part of motion picture coding portion 12 is used also for detection of the motion vector and the sum of squared difference used in change detecting portion 13. Thus, easy implementation becomes possible of an automatic control feature of starting and stopping recording according to a change in images without additionally performing new processing required for detecting the change in input images.

Figure 4:
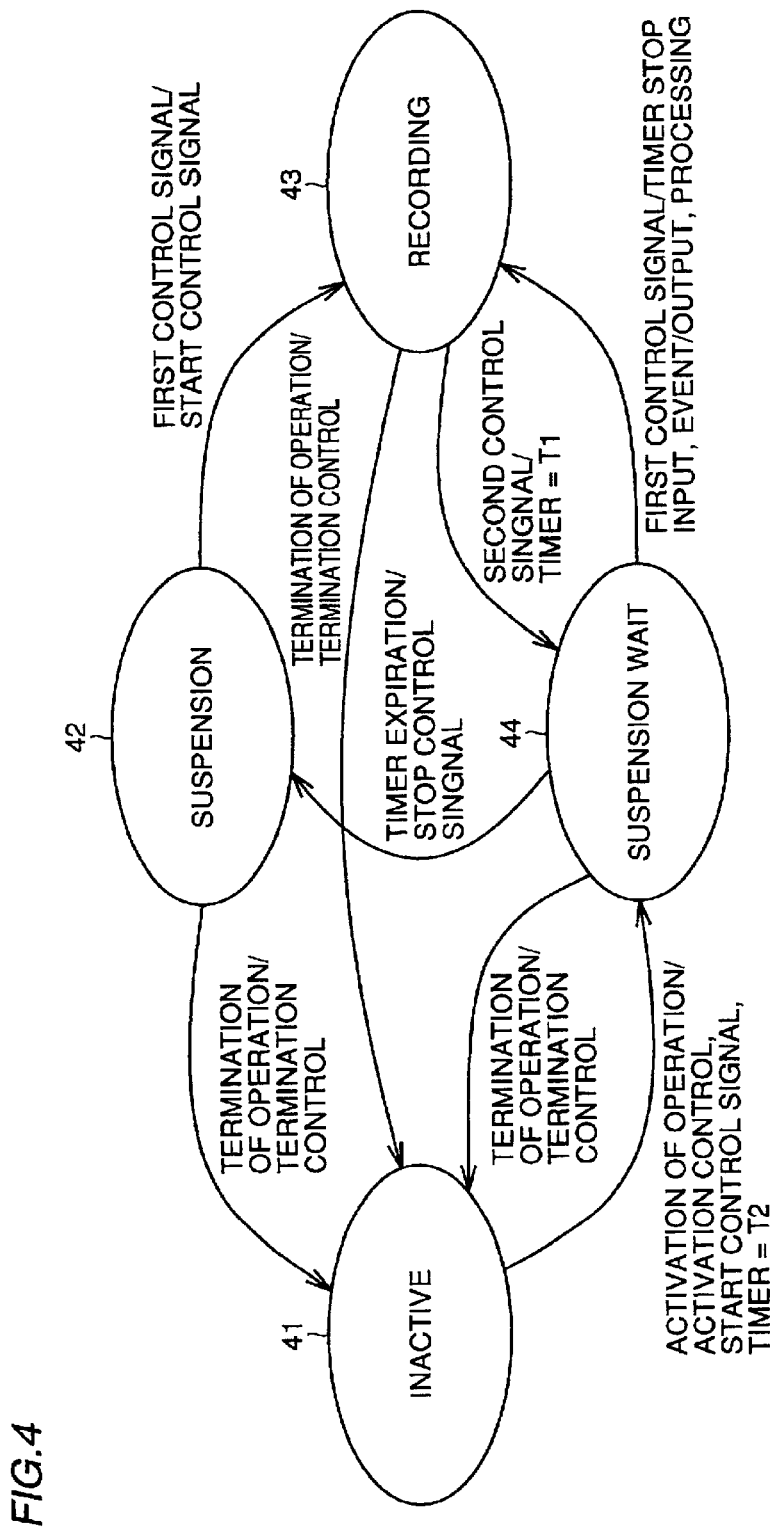
FIG. 4 is a diagram related to the description illustrating an example of a state transition in an operation control portion in the embodiment of the image processing apparatus according to the present invention.

FIG. 4 shows a state transition in operation control portion 14. In FIG. 4, in the descriptions provided for arrows showing transitions between states, the description that comes before "/" indicates occurrence of an event or inputting of a signal that becomes a trigger for the state transition, while the description that comes after "/" indicates a signal that is output or a processing performed at the time which accompanies the state transition.

Operation control portion 14 has four states, namely, an inoperative state 41 in which no operation is being performed, a recording state 43 in which coding processing in motion picture coding portion 12 and recording into storage medium 18 by recording control portion 17 are performed, a suspended state 42 in which operation control portion 14 is activated but is not performing coding processing or recording, and a suspension wait state 44 in which coding processing and recording are performed as in recording state 43 but time is being waited out until a transition to suspended state 42 takes place. Operation control portion 14 manages these four states.

Figure 3:
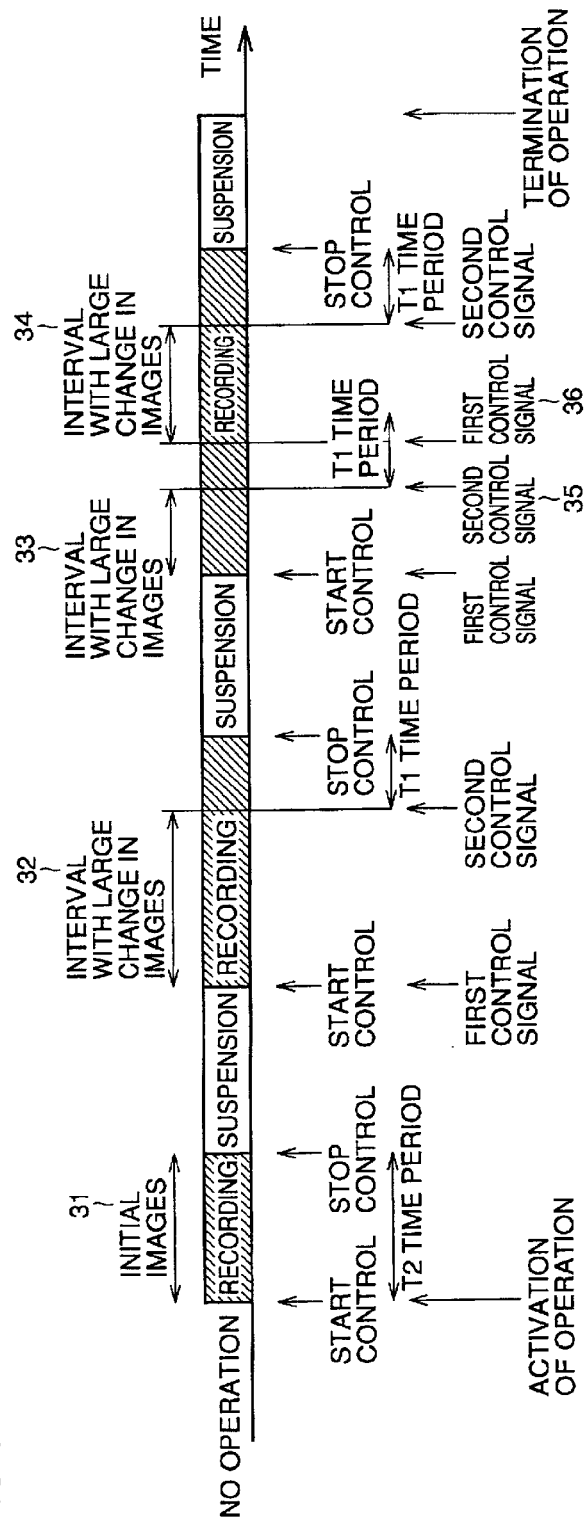
FIG. 3 is a diagram related to the description illustrating an example of an operation of starting and stopping of recording according to the embodiment of the image processing apparatus of the present invention.

Now, an operation of operation control portion 14 will be described according to FIG. 4. In addition, an example of the manner of starting and stopping of coding processing and recording according to a control operation of operation control portion 14 is shown in FIG. 3.

Operation control portion 14 is in inoperative state 41 when coding, recording operation, or the so-called automatic recording mode based on the control by operation control portion 14 is not activated, as immediately after power-on of the image recording apparatus.

When activation of operation (automatic recording mode) of operation control portion 14 is instructed via user manipulation such as pressing of a button or switching of a switch of the image recording apparatus, or by inputting of a control signal or a command signal from outside the apparatus and such, operation control portion 14 outputs an activation control signal to coding control portion 24 in motion picture coding portion 12 and to recording control portion 17 and instructs activation of operation.

Thereafter, operation control portion 14 outputs a start control signal to coding control portion 24 in motion picture coding portion 12 and to recording control portion 17, and instructs starting of coding processing and recording. Operation control portion 14 sets to a time period T2 the value of a timer which waits out the time, and transitions to suspension wait state 44.

Here, the timer is one that has its value subtracted as time passes. Through such processing, recording of images corresponding to the duration of time period T2 in an initial picture-plane recording interval 31 shown in FIG. 3 can be ensured from immediately after activation in the image recording apparatus of the present embodiment. This is one of the characteristics of the image recording apparatus of the present embodiment not found in above-described conventional examples.

Then, in suspension wait state 44 when the timer expires, that is, when the time set on the timer has elapsed and the timer value reaches zero, operation control portion 14 outputs a stop control signal to coding control portion 24 in motion picture coding portion 12 and to recording control portion 17 and instructs stopping of coding processing and recording. Then, coding and recording of images are stopped, and operation control portion 14 transitions into suspended state 42.

In suspended state 42, when a first control signal that indicates that transition to a state in which change in images is large has occurred is input from change detecting portion 13, operation control portion 14 outputs a start control signal to coding control portion 24 in motion picture coding portion 12 and to recording control portion 17, instructs starting of coding processing and recording, and transitions to recording state 43.

During recording state 43, operation control portion 14 does not monitor the elapsed time by a timer, which is the difference found between recording state 43 and suspension wait state 44. In recording state 43, when a second control signal that indicates that transition to a state in which change in images is small has occurred is input from change detecting portion 13, operation control portion 14 sets the value of the timer to a time period T1, and transitions to suspension wait state 44.

At this time, a start control signal and a stop control signal are not output to the outside, and only the internal state of operation control portion 14 changes. In this manner, images from an interval with large change in images 32 shown in FIG. 3 and from the duration of succeeding time period T1 are recorded.

In addition, in suspension wait state 44, when a first control signal is input from change detecting portion 13, operation control portion 14 determines that motion picture data with a large change that is to be a target of recording has been input, and transitions to recording state 43. At this time, the timer used in suspension wait state 44 is no longer used in recording state 43 so that it is stopped.

Moreover, in suspension wait state 44, processing of coding and recording are already being executed and only need to be continued so that no start control signal or stop control signal is output.

An example is shown in an interval 33 and an interval 34 in FIG. 3. Between interval 33 with large change in images and interval 34, an interval exists of a length shorter than time period T1 with small change in images, which conventionally does not become the target of recording. Nonetheless, the image recording apparatus of the present embodiment records images from the beginning of interval 33 until after time period T1 elapses after termination of interval 34.

When a second control signal is output from change detecting portion 13 at the end of interval 33, operation control portion 14 sets the timer value to T1 and transitions to suspension wait state 44. Here, if a first control signal is output from change detecting portion 13 at the beginning of interval 34 before the expiration of the timer, that is, before time period T1 elapses, operation control portion 14 transitions to recording state 43 and continues recording.

In the above-described conventional examples, what comes between interval 33 and interval 34 is not recorded, and the end of interval 33 and the beginning of interval 34 are connected in the recording so that images represent unnatural change in motion at the connections, while frequent switching between starting and stopping of recording occurred. With the image recording apparatus of the present embodiment, however, continuous images are recorded, and no such frequent switching occurs.

In the states of suspended state 42, 43, and suspension wait state 44, respectively, when termination of operation (automatic recording mode) of operation control portion 14 is instructed via user manipulation such as pressing of a button or switching of a switch of the image recording apparatus, or by inputting of a control signal or a command signal from outside the apparatus and such, operation control portion 14 outputs a termination control signal to coding control portion 24 in motion picture coding portion 12 and to recording control portion 17 and instructs termination of operation.

Accordingly, motion picture coding portion 12, recording control portion 17, and operation control portion 14 perform processing for terminating the operation such as for the end of an image being recorded, and terminates the processing operation. Operation control portion 14 transitions to inoperative state 41.

In the above description, time period T1 and time period T2 may be set independently, and may be different values or the same. In addition, the relative lengths of time period T1 and time period T2 can be set at will according to the intended use or purpose.

Here, if T1=T2=0, then only the images from intervals 32, 33, and 34 containing large changes would be recorded, which is a similar operation to the image recording apparatus in a conventional monitor system and the like. In addition, if T1=0, and T2≠0, then images from intervals 32, 33, and 34 containing large changes as well as images such as an initial image and a reference image added to the beginning of such images containing large changes would be recorded.

Figure 5:
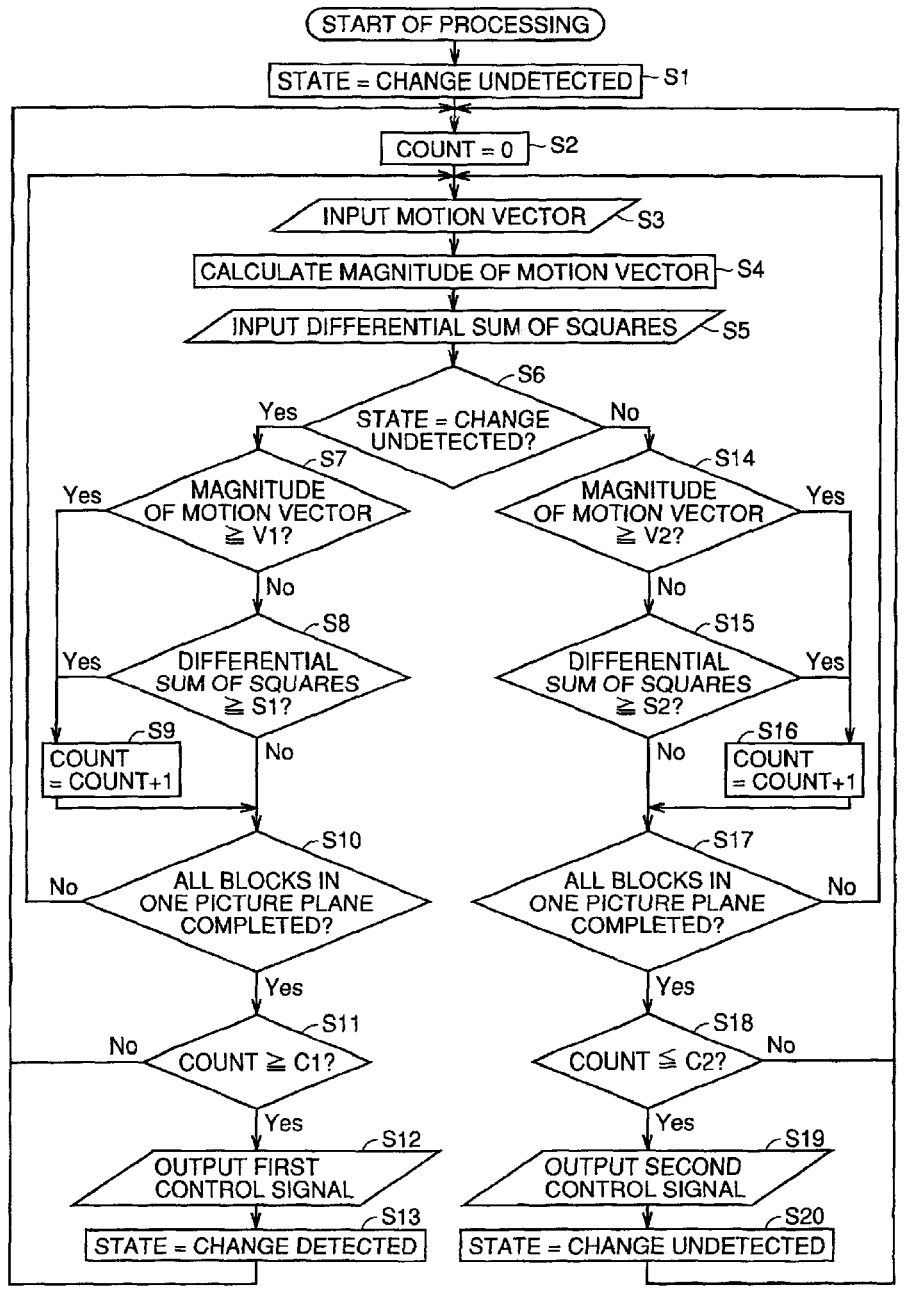
FIG. 5 is a flow chart illustrating an example of an operation of a change detecting portion in the embodiment of the image processing apparatus according to the present invention.

FIG. 5 shows a flow chart illustrating the processing in change detecting portion 13. Change detecting portion 13 holds, within, a state variable for managing the transition from a small change state to a large change state of images and the transition from a large change state to a small change state of images, respectively corresponding to a first control signal and a second control signal.

First, when processing of change detecting portion 13 is started, "change undetected" indicating the small change state of images is set as the state variable (step S1). Then, processing of one picture plane of processing target picture planes in input motion picture data is started. The counter value is reset to zero (step S2).

Then, a motion vector value for a block is input (step S3), and a sum of squared difference for luminance values of pixels within a block is input (step S5). The motion vector value input in step S3 is a two-dimensional vector quantity so that, from this value, magnitude of the motion vector to be used in an evaluation is derived (step S4).

If the motion vector value is MV=(Vx, Vy), then magnitude (length) of the motion vector to be derived, for instance, is calculated as follows:

$$MV1=(Vx^2+Vy^2)^{1/2}.$$

As described above, the motion vector derived in motion compensation prediction portion 21 in motion picture coding portion 12 is utilized as the motion vector. For instance, in the case where a motion vector is derived in motion compensation prediction portion 21 by a rate-distortion characteristic optimization search method which takes into account degradation in coding efficiency due to increased amount of information of the motion vector, the motion vector determined to be the optimum in motion compensation prediction portion 21 does not necessarily express the motion of images appropriately; however, the motion vector is used as it is in change detecting portion 13, or a motion vector which indicated minimum error during the search in motion compensation prediction portion 21 is output to change detecting portion 13 separate from the one used for coding processing.

In addition, in the case where a simplified search technique such as a step search is employed in order to reduce the amount of processing involved in motion vector search in motion compensation prediction portion 21, the motion vector derived by this technique is output to change detecting portion 13 so as to avoid the increase in the amount of processing involved in deriving a motion vector to be used in change detecting portion 13.

Moreover, in the case where a technique such as global motion compensation in which a global motion vector representing a motion of the overall picture plane and a local motion vector representing a localized motion are separately searched, both motion vectors may be output to change detecting portion 13 so that change detecting portion 13 uses them by adding the local motion vector to the global motion vector, or only the local motion vector is output to change detecting portion 13 to be used. The latter proves effective where the camera involves movements of pan and zoom when only the detection of localized changes within images is desired.

Then, the processing diverges according to the internal state variable of change detecting portion 13 (step S6). If the state variable indicates "change undetected," then magnitude of motion vector MV1 derived in step S4 is compared with a threshold value V1 (step S7).

When MV1 is greater than or equal to V1, the counter value is incremented by one (step S9). When MV1 is smaller than V1, a sum of squared difference is compared with a threshold value S1 (step S8).

At this time, if the sum of squared difference is greater or equal to S1, then the process advances to step S9 and the counter is incremented by one. The processing involved in steps S3 to S9 is repeated for every block within a picture plane (step S10).

When processing for all the blocks in one picture plane is completed, the counter value is compared with a threshold value C1 (step S11). Here, the counter value represents the number of blocks within a target picture plane that are determined to contain a large change when compared with reference picture plane, i.e., the number of blocks for which magnitude of the motion vector is greater or equal to threshold value V1 or for which the sum of squared difference is greater or equal to threshold value S1.

When the counter value is greater or equal to threshold value C1, it is determined that the images contain a large change, and change detecting portion 13 outputs a first control signal (step S12). Then, the internal state variable of change detecting portion 13 is set to "change detected" (step S13). This completes the processing for the target picture plane so that a return is made to step S2 to perform processing of the next target picture plane.

In the flow chart of FIG. 5, in steps S10 and S11, the counter value is compared with threshold value C1 after it is determined that processing for all the blocks in one picture plane is completed.

The counter value, however, is only changed when it is simply incremented by one in step S9. Thus, even though not all the blocks in the picture plane have been processed, the counter value may be compared with threshold value C1 after step S9 and, if the counter value is greater or equal to C1, the process may proceed to step S12 so that the processing of the remaining blocks in the target picture plane may be skipped.

Moreover, at a block in the midst of the picture plane, even when all the remaining blocks are determined as "Yes" in step S7 or in step S8 and are counted in step S9, upon completion of the processing of all blocks within the picture plane, the processing of the picture plane may be terminated and a return may be made to step S2 at the point in which it is established that the counter value would be less than C1 (for instance, a current count<C1−number of remaining blocks).

Furthermore, although square-root calculation for deriving the magnitude of a motion vector is performed in step S4, the square-root calculation can be dispensed with by utilizing $MV1^2=(Vx^2+Vy^2)$ for the determination.

In this case, $V1^2$ may be used as a threshold value that is the equivalent of threshold value V1 in step S7, and $MV1^2$ and threshold value $V1^2$ are compared in step S7. Thus, the square-root calculation, which generally involves greater processing load, becomes unnecessary, and reduction in processing time and in amount of processing, and simpler processing can be achieved.

Moreover, in steps S5 and S8, although a sum of squared difference is output from motion compensation prediction portion 21 of motion picture coding portion 12 and used for processing in change detecting portion 13, a feature amount, other than the sum of squared difference, that expresses a sum total of differences of pixel values within a block or energy between a block of the target picture plane and a block of the reference picture plane can be utilized such as a sum of absolute differential values, energy weighted with visual characteristic, frequency component, or the like.

If in step S6 the state variable inside change detecting portion 13 is "change detected," the process moves to step S14. The processing in steps S14 to S20 is substantially the same as the processing in steps S7 to S13.

The differences between the processing in steps S14 to S20 and the processing in steps S7 to S13 are that the threshold value in step S14 is not V1 but is V2, the threshold value in step S15 is not S1 but is S2, the threshold value in step S18 is not C1 but is C2, a second control signal is output in step S19 if the counter value is less than or equal to C2 in step S18, and the state variable is set to "change undetected" in step S20.

In steps S7 to S13, processing is performed to detect that a large change has occurred where the change in images is small in input motion picture data, whereas processing in steps S14 to S20 corresponds to detecting that the change has become smaller where the change in images is large.

Here, threshold values V1, S1, and C1 and threshold values V2, S2, and C2 can be set separately so that V1 and V2, S1 and S2, and C1 and C2, respectively, may be set to have different values, or the same values according to the intended use or purpose.

When only a relatively large change is to be detected as appearance of an intruder, for instance, V1, S1, and C1 should be set to large values, whereas to allow detection of even a subtle change, V1, S1, and C1 should be set to small values.

Moreover, a determination condition for outputting a second control signal that serves as a trigger for stopping the recording can be suitably set using V2, S2, and C2. These values are not dependent on V1, S1, and C1.

Although branching of processing in step S6 is provided according to the state variable in the flow chart of FIG. 5, the values of the threshold values used by the state variable in steps S7, S8, and S11 can be switched instead of providing branching of processing, or the branching may be provided immediately before step S2 which is the beginning of processing for one picture plane. The order of processing and such is not limited to any one way as long as a result of processing that is the equivalent of the above-described processing can be derived.

Moreover, although all blocks within the target picture plane are to be processed in steps S10 and S17, blocks at an edge of the picture plane can be excluded from the processing, for instance.

In this way, adverse influences cause to processing in change detecting portion 13 by timing jitter of an image signal in edges at four surrounding sides of a picture plane and the like, noise upon image pickup, flicker of scanning line in an image converted from an interlace format into a progressive format, and the like can be avoided.

Consequently, such noises are no longer detected as changes in images so that accurate detection of changes in images can be ensured even with input motion picture data including noise.

As described above, in the present embodiment, a motion vector value for a block which is obtained by dividing a picture plane of input motion picture data into blocks of a prescribed size, and a sum of squared difference of luminance values of pixels for blocks in the same position between picture planes are input to change detecting portion 13 from motion picture coding portion 12.

Change detecting portion 13 compares a sum of squared difference with a predetermined threshold value S1 and a length of a motion vector with a predetermined threshold value V1 for each block when transition from a small change state to a large change state of images is detected.

This comparison is performed for all the blocks in the picture plane, and the number of blocks in which the sum of squared difference is greater than or equal to a threshold value S1 or the length of the motion vector is greater or equal to a threshold value V1 are counted. When the counted result is greater or equal to a predetermined threshold value C1, a first control signal is output.

In addition, when detecting the transition from a large change state to a small change state of images, the number of blocks in which the sum of squared difference is greater than or equal to a threshold value S2 or the length of the motion vector is greater or equal to a threshold value V2 are counted, and a second control signal is output when the counted result is less than or equal to a predetermined threshold value C2.

Although the above description mainly involves the case where motion picture data is recorded, the image recording apparatus of the present embodiment may be configured such that it records voice data in addition to images.

In this case, processing such as coding and recording for input voice data, like the processing for input motion picture data, is started or stopped according to a start control signal and a stop control signal from operation control portion 14.

In the case of voice data, amount of information is small when compared with images so that input voice data is recorded without being subjected to compression coding processing in some cases. In addition, in order to maintain synchronization between an image and voice at the time recording is started or stopped, coding processing and recording are controlled such that recording is started with image data and voice data that are generated or input at the same time and stopped at image data and voice data that are generated or input at the same time.

Moreover, in order to record both motion picture data and voice data into storage medium 18, recording control portion 17 performs multiplexing processing of coded motion picture data and (coded) voice data according to a recording format and a file format of storage medium 18.

Furthermore, an example in which the present invention is applied to an image recording apparatus is described in the above-described one embodiment. It is also possible, for instance, to apply the present invention to an image transmission apparatus that sends motion picture data containing a change to a central managing unit or a terminal at the other end via a transmission line.

In this case, recording control portion 17 can be substituted by a communication control portion which performs line connection, communication protocol processing, forming of coded motion picture data into transmission format, and so on, and storage medium 18 can be substituted by a transmission path such as a communication line, respectively. The arrangement in other parts is the same as that in the image recording apparatus according to the above-described one embodiment of the present invention.

At this time, if change detecting portion 13 determines that a change has occurred in input motion picture data and operation control portion 14 outputs a start control signal, the communication control portion establishes a line connection and sends coded motion picture data to a receiving unit.

The line connection established by the communication control portion may be by a physical line connection processing such as a call set-up or a logical connection in the case where a connectionless network such as a LAN (Local Area Network) is employed as the transmission path.

In addition, as in a packet switched network, when the physical connection is maintained and no data transmission is performed during suspension of operation, although there is no need to execute the connection procedure explicitly, the communication control portion would sequentially transmit coded motion picture data output from motion picture coding portion 12 according to a start control signal output from operation control portion 14.

Moreover, after change detecting portion 13 determines that the change in input motion picture data has become smaller, if a stop control signal is output from operation control portion 14, the communication control portion disconnects the line and stops transmission of coded motion picture data to the receiving unit.

Like the connection establishment described above, the line disconnection may be a physical or logical disconnection processing, depending on the type of the transmission path to which the image transmission apparatus is connected.

In the image recording apparatus of the present embodiment, the recording or the transmission is controlled to be stopped after a predetermined time after it is detected that the change in the images has becomes small so that a series of images from occurrence of a change to disappearance of the change can be recorded or transmitted, i.e. from an image in which a change occurred up to background images, scenery images, and the like from after the disappearance of an intruder or abnormality, or the stopping of movement of and the disappearing of a target being observed. Thus, images having natural flow can be obtained, while at the same time, disappearance of a change can be confirmed from images recorded or transmitted.

In addition, the recording or transmission can be continued even in the case where an intruder temporarily stops his movement so that images can be obtained that ensure a full grasp of the condition of the target being monitored.

Furthermore, even in the case where a plurality of state changes are recorded or transmitted as a series of images, since it is possible to record or transmit the images along with those images representing no changes intervening in between, not only can natural images be obtained, but also confirmation can be made from the recorded or transmitted images that sometime a condition in which an intruder or an abnormality disappeared existed.

In particular, even with images including alternating repetition of a large change state and a small change state, these images can be treated as continuous images without having frequently to switch between starting and stopping of recording or transmission.

Thus, complex intricate control becomes unnecessary, while recording or transmission of images having natural flow, movement, and change becomes possible, and particularly when images are transmitted, connection delay, negotiation delay, initial transmission delay, and the like that occur upon connection to a communication line can be avoided.

In this manner, the process required for delaying the stopping of recording or transmission can be easily achieved by waiting for a prescribed time period T1 using a timer and the like after it is detected that the change is small so that implementation is facilitated. As a result, almost no addition takes place of hardware and software required for the process, and implementation is also facilitated in compact, portable equipment.

In the image recording apparatus of the present embodiment, when an operation is activated for controlling starting and stopping of recording or transmission by the operation control portion, it is controlled to start the recording or transmission as an initial state so that the so-called reference images such as of background and scenery that are to become a target of monitoring or observation before a change takes place can be initially recorded or transmitted.

Thus, it becomes possible to confirm what sort of change has taken place within a series of images when images in which a change is detected are recorded or transmitted at a later time. Particularly, both the state without the change and the state with a change occurring can be confirmed from the recorded or transmitted images even in the case of general images which is different from the case of a security supervision system where the target to be monitored is specified in advance so that the manner and condition of the change can be accurately recognized without prior knowledge regarding the target to be monitored.

In this manner, images having natural flow can be obtained, since recording or transmission is possible of continuous images from images of a state having no change to images having a change taking place.

In addition, when a control operation for recording or transmission is activated, the initial images would be recorded or transmitted without fail even though no change may occur later to the images. Thus, the very existence of such recorded or transmitted images can serve as a record of the fact that no change had occurred.

Moreover, in the case where no change occurs to the images, the special control for completely deleting information that is in the midst of recording and the temporarily recorded content in order to avoid recording of images and additional information becomes unnecessary. Further, every time a control operation is activated, storage region may be secured, additional information may be recorded, and preliminary line connection such as a transmission link may be established so that the processing can be simplified.

The processing required for this purpose is a control to start recording or transmission as soon as the recording operation based on the above-described control is activated and to stop the recording or transmission after waiting for a prescribed time period T2 using a timer and the like. Addition of such processing provides simple realization of the control and facilitates implementation. Thus, almost no addition of hardware and software required for the processing takes place, and implementation in compact, portable equipment is facilitated as well.

Moreover, in the image recording apparatus of the present embodiment, images starting from images of background, scenery, and such before a change takes place, images containing the change, and images in which the state without the change is restored are recorded or transmitted as a series of images so that discomfort, which is caused when the flow and motion of the images and the change become discontinuous and unnatural due to starting and stopping in the middle, becomes minimal, and more natural images can be obtained.

Furthermore, the image recording apparatus of the present embodiment allows for setting to different values a time period T2 in which images are recorded or transmitted initially at the activation of the operation and a time period T1 in which recording or transmission is continued even after it is determined that the change has become smaller after a state change in the images is detected, so that appropriate values can be selected and utilized for these time periods according to the intended use or purpose.

For example, time period T1 alone may be set to a large value such that, once a change in images is detected, recording or transmission is not interrupted but is continued until another change occurs, or time period T2 alone may be set to a large value when it is desired that initial images that are to serve as reference images are recorded or transmitted without fail. In this manner, a great degree of freedom in usage is allowed.

Thus, a wider range of application of the image processing apparatus is achieved, while images of suitable content can be recorded or transmitted for various users and applications.

In addition, the image recording apparatus of the present embodiment detects the change in images based both on the difference of pixel values between picture planes in input images and on magnitude of a motion vector so that, as opposed to the case in which one of these two is used singly, the advantages of the two can be effectively utilized while defects are mutually compensated for, ensuring successful detection of a change in images.

Specifically, since a motion vector is used to detect a change in images, a motion of an object occurring within the images can be detected as a change even when the size of the object or the region in motion is small.

Moreover, by utilizing a difference of pixel values between picture planes, variation of a pixel value due to some change occurring in an image can be detected as a change without fail. In addition, changes that cannot be detected with a motion vector, such as complex changes in images or a motion accompanying variation in color and brightness, can also be detected.

Furthermore, for images that should not be determined as containing a change, such as a noise contained in an input image, changes in illumination or brightness, the entire image with a background or scenery moving slightly, and so on, threshold values S1 and S2 for evaluation of a difference between picture planes can be set to large values so that these phenomena would not be detected as a change, while detection of a change can be ensured using the evaluation of a motion vector also being employed.

Thus, the image recording apparatus of the present embodiment is applicable for a variety of images, and according to a variety of purposes and input conditions, for both the case in which only a small portion of the images undergoes a change yet the motion is large and the case in which the entire image undergoes a change yet the change cannot be detected as a motion, so that flexible and successful detection of a change in images can be ensured.

In addition, in the image recording apparatus of the present embodiment, a condition for determination to start recording or transmission and a condition for determination to stop recording or transmission can be set differently so that these conditions can be changed according to the intended use or purpose.

For instance, determination may be made to start recording of transmission for images containing a relatively large change as in the case where a target to be observed such as an intruder makes an appearance, and thereafter, the determination condition may be made more strict by changing to a smaller value the threshold value related to determination to stop recording or transmission such that the observation can be continued even when the movement of the target being observed is not so great.

Conversely, the determination condition may be set at first such that even a very subtle change would result in starting of recording or transmission, and when no great change occurs, the recording or transmission is stopped. In addition, setting a threshold value for determination to start recording or transmission and a threshold value for determination to stop recording or transmission to a same value and thus setting the determination conditions to be the same is also easily done.

Thus, it becomes possible to control starting and stopping of recording or transmission by setting an appropriate determination threshold value according to the intended purpose, use, and the content of the target image so that a wider range of application of the image processing apparatus is achieved. Moreover, the image processing apparatus can be utilized in various applications to detect a change in images under conditions suitable for the intended purpose.

In addition, since the image recording apparatus of the present embodiment detects a change in images using a motion vector derived from motion compensation prediction processing performed when input motion picture data is subjected to coding processing for recording or transmission and a difference of pixel values between picture planes, no new additional processing need to be provided in order to derive a feature amount required for detection of a change in images.

Since the processing required for detection of a change in images is only the very simple processing such as comparing a motion vector or a sum of squared difference with a threshold value, an increase in the amount of processing due to these additions is almost negligible. Thus, implementation can be facilitated even in the case where low power consumption and compactness are desirable as in portable equipment and the like.

By additionally providing the above-described simple processing to a widespread image processing apparatus provided with a motion picture coding unit, the apparatus can be easily provided with an automatic control feature of starting and stopping of recording or transmission according to a change in images. Thus, it becomes possible to bring out to the fullest the advantages of performing a digital image processing using such apparatuses, while use development and widespread proliferation can be achieved through simple addition and extension of a feature.

Moreover, in the image recording apparatus in the present embodiment, the same frame memory can be used during coding processing operation, processing operation of recording or transmission, and suspension of operation. In particular, since the amount of memory such as a frame memory significantly influences mounting area in mounting to equipment, cost, and power consumption so that the capability to add an automatic control feature of recording or transmission without increasing the amount of memory through sharing of the frame memory for motion picture coding processing proves extremely effective in achieving compactness, economy, and low power consumption of the apparatus.

In addition, since this is achieved by simply adding the feature of switching the input of the frame memory, only a very simple alteration is necessary. Moreover, a motion compensation prediction unit needs only to read out a reference picture plane from the frame memory constantly, regardless of the states, i.e., whether in operation of recording or transmission or in suspension, so that a motion compensation prediction processing portion for the normal motion picture coding processing can be utilized as it is.

Furthermore, while recording or transmission is suspended, a picture plane of input motion picture data is stored directly into the frame memory so that no local decoding processing in a prediction error coding portion is necessary, and the processing of the prediction error coding portion can be completely stopped so that reduction in power consumption can be achieved.

Moreover, with the image recording apparatus of the present embodiment, the operative condition of the image processing apparatus, i.e. whether in recording or transmission or in suspension, can be announced by an announcing unit so that a user can easily determine the operative condition of the apparatus from a remote location.

In other words, the operative condition can be announced to a user far away from the apparatus so that the user does not need to look at a viewfinder, a monitor screen, or the like of the apparatus in order to confirm the condition of the image processing apparatus. Thus, it can easily be confirmed whether starting and stopping of recording or transmission is correctly controlled according to the intended purpose based on a motion of an object or a change.

In addition, the development of new field of application of image processing apparatus other than that for a monitor system becomes possible, the examples including photographing of a self-portrait where the user himself becomes an object of image pickup and picks up an image of himself while confirming the condition of the image processing apparatus, utilizing a motion or a change instead of a self-timer of a camera in order to start recording or transmission and confirming the condition thereof, and moving the object while the operation is suspended and creating an animation using images recorded or transmitted.

In the image recording apparatus of the present embodiment, announcement can be provided of the condition of recording or transmission with an illuminated LED or lamp, which offers high viewability, so that a user is able to acknowledge the operative condition of an apparatus with ease even from a remote location.

In particular, when an LED is used, since an LED is very small and consumes little power, the cost for providing an announcement unit, power consumption, and size increase is almost negligible, while it involves almost no restriction related to mounting such as mechanism or design. Thus, the use of an LED is suitable for compact, portable equipment and is readily implemented in such equipment.

In the image recording apparatus of the present embodiment, announcement can be provided of starting of or stopping of recording or transmission by producing a sound so that the user is able to acknowledge a change in the operative condition of the image recording apparatus with ease even when the user is not visually acknowledging the apparatus.

Thus, recognition of the operative condition becomes possible even when an installation technique such as placing the apparatus in a corner or in a hidden location of a room, which is often done in the case of monitor systems, is employed. Consequently, there is no need for the user to face the direction of the apparatus even when the user himself is to be an object of image pickup as described above, and image pickup of a profile and of a view from the back becomes possible.

In addition, if the announcement by sound is provided immediately after the start of operation of recording or transmission such that the sound from an announcing unit is also recorded or transmitted together with the image, in images recorded or transmitted where starting and stopping of recording or transmission are successively repeated, it becomes easy later on to specify the locations in which recording or transmission was started, i.e., the connections of these several repetitions through identification of the sounds of announcement.

In the image recording apparatus of the present embodiment, a change in images is detected using a motion vector derived from motion compensation prediction processing when input motion picture data is subjected to coding processing, and a difference of pixel values between picture planes so that no new processing need to be added in order to derive a feature amount required for detection of a change in images.

Since the processing required for detection of a change in images is only the very simple processing such as comparing a motion vector or a sum of squared difference with a threshold value, increase in the amount of processing due to these additions is almost negligible. Thus, implementation can be facilitated even in the case where low power consumption and compactness are desirable as in portable equipment and the like.

By additionally providing the above-described simple processing to a widespread image processing apparatus provided with a motion picture coding unit, the apparatus can be easily provided with an automatic control feature of starting and stopping of recording or transmission according to the change in images. Thus, it becomes possible to bring out to the fullest the advantages of performing a digital image processing using such apparatuses, while use development and widespread proliferation can be achieved through simple addition and extension of a feature.

In the image recording apparatus of the present embodiment, the same frame memory can be used during coding processing operation, processing operation of recording or transmission, and suspension of operation. In particular, since the amount of memory such as a frame memory significantly influences mounting area in mounting to equipment, cost, and power consumption so that the capability to add an automatic control feature of recording or transmission without increasing the amount of memory through sharing of the frame memory for motion picture coding processing proves extremely effective in achieving compactness, economy, and low power consumption of the apparatus.

In addition, since this is achieved by simply adding the feature of switching the input of the frame memory, only a very simple alteration is necessary. Moreover, a motion compensation prediction unit needs only to read out a reference picture plane from the frame memory constantly, regardless of the states, i.e., whether in operation of recording or transmission or in suspension, so that a motion compensation prediction processing portion for the normal motion picture coding processing can be utilized as it is.

Furthermore, while recording or transmission is suspended, a picture plane of input motion picture data is stored directly into the frame memory so that no local decoding processing in a prediction error coding portion is necessary, and the processing of the prediction error coding portion can be completely stopped so that reduction in power consumption can be achieved.

In the image recording apparatus of the present embodiment, a timing of recording or transmission can be announced during recording or transmission using timelapse in which input motion picture data is recorded or transmitted intermittently so that a user can easily determine from a remote location when the apparatus is recording or transmitting.

In other words, since the timing of recording or transmission can be announced to a user in a location remote from the apparatus, the user, while confirming the timing of recording or transmission, can easily move an object of image pickup during suspension between recording or transmission and create an animation using the recorded or transmitted images.

In addition, when the user himself becomes an object of image pickup and picks up an image of himself as in the case of picture taking with a camera using a self-timer, the timing of recording or transmission is recognized easily and clearly so that recording or transmission of images that suit the purpose can be ensured, and failure of image pickup is less likely to occur.

Thus, such apparatuses can be utilized not only for specialized uses such as for a monitor system but also by a general user with ease and for a variety of purposes, which leads to development of new applications of an image recording apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   a change detecting portion for detecting a change between picture planes of input motion picture data and outputting a first control signal indicating a transition from a small change state to a large change state and a second control signal indicating a transition from a large change state to a small change state; and
   an operation control portion for controlling starting and stopping of recording or transmission of input motion picture data according to said first control signal and said second control signal, wherein
   during recording or transmission, said operation control portion controls to stop recording or transmission of said input motion picture data if no outputting of said first control signal occurs until after a prescribed time T1 elapses after said second control signal is output.

2. The image processing apparatus according to claim 1, wherein said change detecting portion divides a picture plane of input motion picture data into blocks of prescribed size and includes
   a first counter for counting number of blocks in which a sum of squared difference of luminance values between picture planes for pixels contained in a block is at least a prescribed threshold value S1, or number of blocks in which a length of a motion vector for said block is at least a prescribed threshold value V1, and
   a second counter for counting number of blocks in which said sum of squared difference is at least a prescribed threshold value S2 or the length of said motion vector is at least a prescribed threshold value V2, and wherein
   said first control signal is output based on said first counter being at least the prescribed threshold value C1, and
   said second control signal is output based on said second counter being at most the prescribed threshold value C2.

3. The image processing apparatus according to claim 2, wherein
   said threshold values S1, V1, C1, S2, V2, and C2 are respectively set to different values.

4. The image processing apparatus according to claim 1, further comprising:

a motion compensation prediction portion for dividing a picture plane of input motion picture data into prescribed regions, performing for each region a motion compensation prediction with a reference picture plane stored in a frame memory, and outputting a prediction error, a motion vector of said each region, and a sum of squared difference of luminance values of pixels within said region between picture planes; and a prediction error coding portion for coding said prediction error and outputting coded motion picture data, wherein said change detecting portion detects a change between picture planes from said motion vector and said sum of squared difference and outputs a first control signal indicating a transition from a small change state to a large change state and a second control signal indicating a transition from a large change state to a small change state.

5. The image processing apparatus according to claim 4, wherein said frame memory stores a local decoded image derived by adding a prediction picture plane output from said motion compensation prediction portion and a decoded result of a prediction error output from said prediction error coding portion when input motion picture data is being recorded or transmitted, and stores a picture plane of input motion picture data when recording or transmission is suspended.

6. The image processing apparatus according to claim 1, further comprising:

an announcing portion for announcing to outside of apparatus that a recording operation or a transmission operation is currently taking place, according to control of starting and stopping of recording or transmission of input motion picture data by said operation control portion.

7. The image processing apparatus according to claim 6, wherein said announcing portion indicates that recording or transmission operation is currently taking place by illuminating an LED or a lamp.

8. The image processing apparatus according to claim 6, wherein said announcing portion announces that a change in an operative condition has occurred by providing a sound upon starting of recording or transmission and/or stopping of recording or transmission.

9. An image processing apparatus, comprising:

a change detecting portion for detecting a change between picture planes of input motion picture data and outputting a first control signal indicating a transition from a small change state to a large change state and a second control signal indicating a transition from a large change state to a small change state; and an operation control portion for controlling starting and stopping of recording or transmission of input motion picture data according to said first control signal and said second control signal, wherein said operation control portion controls to start recording or transmission of input motion picture data as soon as an operation is activated for controlling starting and stopping of recording or transmission by said operation control portion, and thereafter controls to stop recording or transmission of said input motion picture data when a prescribed time period T2 has elapsed without said first control signal being output.

10. The image processing apparatus according to claim 9, wherein said operation control portion controls to stop recording or transmission of input motion picture data if no outputting of said first control signal occurs until after a prescribed time T1 elapses after said second control signal is output.

11. The image processing apparatus according to claim 10, wherein said time period T1 and said time period T2 are respectively set to different values.

12. The image processing apparatus according to claim 9, wherein said change detecting portion divides a picture plane of input motion picture data into blocks of prescribed size and includes a first counter for counting number of blocks in which a sum of squared difference of luminance values between picture planes for pixels contained in a block is at least a prescribed threshold value S1, or number of blocks in which a length of a motion vector for said block is at least a prescribed threshold value V1, and a second counter for counting number of blocks in which said sum of squared difference is at least a prescribed threshold value S2 or the length of said motion vector is at least a prescribed threshold value V2, and wherein said first control signal is output based on an output from said first counter being at least the prescribed threshold value C1, and said second control signal is output based on an output from said second counter being at most the prescribed threshold value C2.

13. The image processing apparatus according to claim 12, wherein said threshold values S1, V1, C1, S2, V2, and C2 are respectively set to different values.

14. The image processing apparatus according to claim 9, further comprising:

a motion compensation prediction portion for dividing a picture plane of input motion picture data into prescribed regions, performing for each region a motion compensation prediction with a reference picture plane stored in a frame memory, and outputting a prediction error, a motion vector of said each region, and a sum of squared difference of luminance values of pixels within said region between picture planes; and a prediction error coding portion for coding said prediction error and outputting coded motion picture data, wherein said change detecting portion detects a change between picture planes from said motion vector and said sum of squared difference and outputs a first control signal indicating a transition from a small change state to a large change state and a second control signal indicating a transition from a large change state to a small change state.

15. The image processing apparatus according to claim 14, wherein said frame memory stores a local decoded image derived by adding a prediction picture plane output from said motion compensation prediction portion and a decoded result of a prediction error output from said prediction error coding portion when input motion picture data is being recorded or transmitted, and stores a picture plane of input motion picture data when recording or transmission is suspended.

16. The image processing apparatus according to claim 9, further comprising:

an announcing portion for announcing to outside of apparatus that a recording operation or a transmission operation is currently taking place, according to control of starting and stopping of recording or transmission of input motion picture data by said operation control portion.

17. The image processing apparatus according to claim 16, wherein said announcing portion indicates that recording or transmission operation is currently taking place by illuminating an LED or a lamp.

18. The image processing apparatus according to claim 16, wherein said announcing portion announces that a change in an operative condition has occurred by providing a sound upon starting of recording or transmission and/or stopping of recording or transmission.

19. An image processing apparatus, comprising:

a motion compensation prediction portion for dividing a picture plane of input motion picture data into prescribed regions, performing for each region a motion compensation prediction with a reference picture plane stored in a frame memory, and outputting a prediction error, a motion vector of said each region, and a sum of squared difference of luminance values of pixels within said region between picture planes;

a prediction error coding portion for coding said prediction error and outputting coded motion picture data;

a change detecting portion for detecting a change between picture planes from said motion vector and said sum of squared difference and outputting a first control signal indicating a transition from a small change state to a large change state and a second control signal indicating a transition from a large change state to a small change state; and an operation control portion for controlling starting and stopping of recording or transmission of input motion picture data according to said first control signal and said second control signal.

20. The image processing apparatus according to claim 19, wherein said frame memory stores a local decoded image derived by adding a prediction picture plane output from said motion compensation prediction portion and a decoded result of a prediction error output from said prediction error coding portion when input motion picture data is being recorded or transmitted, and stores a picture plane of input motion picture data when recording or transmission is suspended.

* * * * *